United States Patent [19]
First

[11] 3,792,326
[45] Feb. 12, 1974

[54] CHOPPER-CONTROLLED SCHEME FOR INFINITE FIELD WEAKENING OF SERIES MOTORS

[75] Inventor: Antonin First, Praha, Czechoslovakia

[73] Assignee: CKD Praha, oborovy podnik, Praha, Czechoslovakia

[22] Filed: Mar. 30, 1971

[21] Appl. No.: 129,366

[30] Foreign Application Priority Data
Apr. 6, 1970 Czechoslovakia .................. 2278-70

[52] U.S. Cl. .............................. 318/138, 318/251
[51] Int. Cl. ............................................. H02k 5/16
[58] Field of Search............ 318/138, 139, 244–246, 318/249, 254, 341, 345, 346, 501–509, 512, 513, 251

[56] References Cited
UNITED STATES PATENTS
3,466,522  9/1969  Cushing, Jr. ..................... 318/501 X
3,560,821  2/1971  Beling ............................... 318/138
3,575,652  4/1971  Snyder ........................... 318/507 X FOREIGN PATENTS OR APPLICATIONS
4,310,709  12/1965  Japan ................................ 318/251

Primary Examiner—Bernard A. Gilheany
Assistant Examiner—W. E. Duncanson, Jr.
Attorney, Agent, or Firm—Murray Schaffer

[57] ABSTRACT

Circuit arrangement for starting and controlling the running of series connected motors comprising a chopper circuit, and a blocking diode arranged serially with the motor and a source of current. The blocking diode is connected to one pole of the field winding and arranged conductively for running current. A resistor shunts the diode.

9 Claims, 2 Drawing Figures

ANTONIN FIRST
INVENTOR

CHOPPER-CONTROLLED SCHEME FOR INFINITE FIELD WEAKENING OF SERIES MOTORS

BACKGROUND OF THE INVENTION

The present invention relates to an arrangement for electronically starting and controlling the running of series connected direct current motors particularly of the heavy duty traction type used to propel locomotives, trolleys, omnibuses, and the like.

Solid state, semi-conductor controls have been employed within recent years for both the starting of direct-current energized traction drives and for their running speed control. In such arrangements the conduction of current to the motor is transmitted through a silicon controlled rectifier (SCR) circuit, such as a thyristor chopper circuit, which can be triggered to conduct current at varying intervals. Conventionally an increase in motor running speed was achieved by employing one or more armature shunting steps which, however, cause immediate lowering of the traction torque even at constant armature current. A second expedient involved connecting the field winding into a commutator diode circuit used for reducing the exciting or starting current. However, in this latter circuit, it was not possible to limit the degree of field weakening and the existence of imminent danger of commutator flash-over or arcing was ever present. Consequently the thyristor chopper circuit had to be operated with a shorter conduction interval of the main thyristor relative to that of the work cycle. This resulted in extra losses in the commutator circuit and in lowering of voltage to the motor from the power source.

It is an object of the present invention to provide a control arrangement for direct current energized motors overcoming the drawbacks of the prior art.

It is a further object of the present invention to provide an arrangement for silicon controlled rectifier chopper energized motors which provides for increasing speed at minimal reduction in traction torque.

It is a further object of the present invention to provide an arrangement for the infinite controlled weakening of the motor field at increased running speed with virtually no loss in torque.

These objects, others, and numerous advantages will be observed from the present invention, in which an arrangement substantially overcoming the disadvantages of the prior art is obtained by employing a large exciting current during starting, full voltage across the motor once it comes up to speed and simultaneously insuring that the permissible field weakening limit will not be overreached or stepped.

SUMMARY OF THE INVENTION

According to the present invention an arrangement for starting and controlling the speed of a series motor is provided comprising, means for causing intermittent conduction of current, and a unidirectional blocking means serially arranged with a source of current and the motor. The blocking means has one of its poles connected to the field winding and is directionally arranged to conduct current for running. A resistor is connected in parallel between the field winding and the blocking means to shunt the blocking means.

Preferably the intermittent conduction means is a semiconductor circuit employing a silicon controlled rectifier such as a thyristor, which affords a chopped passage of current at regulated timed intervals. The unidirectional blocking means is a diode.

A second blocking means or diode may be arranged across the motor armature to shunt it also. Various arrangements of the components can be made.

BRIEF DESCRIPTION OF THE DRAWINGS

The application of the present invention is shown in the accompanying drawing in which.

DESCRIPTION OF THE INVENTION

In the following description details are limited in accordance with the Commissioner's Notice 859 O.G. 1 to those elements and features which are necessary to fully understand the present invention. Omitted from the present description are details of thyristor or silicon controlled rectifier circuits, motor armature and field windings and constructions, power sources and other details which have become conventional in this art. For such details reference can be made to the following, the contents of which are incorporated herein as if more fully set forth:

Applicant's copending application Ser. No. 129,367, now abandoned, entitled Acceleration and Braking Control System for Electric Motors. based upon Czechoslovak application No. PV 2248-70, of Apr. 4, 1970, which application discloses and claims a dynamic braking system for electric motors employing similar components, and elements to that employed herein. Reference can be made to certain operational explanations given therein.

Figure 1:
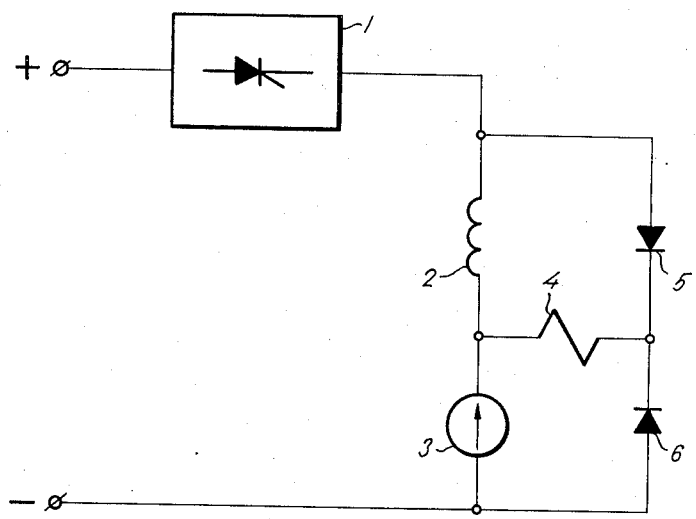
FIG. 1 is a circuit diagram showing the arrangement of the present invention wherein one pole of the motor armature is connected directly to the power source.

In the embodiment seen in FIG. 1 a chopper circuit 1 for causing intermittent conduction of current, preferably a semi-conductor circuit of thyristor type is shown. The thyristor circuit may include one or more silicon rectifiers, gate means, diode rectifiers, and other electronic means, by which it is triggered at predetermined and variable intervals to conduct predetermined levels of current. The thyristor circuit is connected to one terminal (here shown as the positive + terminal) of a direct current power source and to the motor armature 3 via a shunting resistor 2 of predetermined or variable resistance. One pole of the field winding 4 of the motor is connected at the junction of the motor armature 3 and the shunting resistor 2 while the other pole is connected to a blocking diode 5 (vacuum tube or semi conductor) connected to the junction of the thyristor circuit 1 and the shunting resistor 2. A commutating diode 6 (which may also be a vacuum tube or semi-conductor) is connected between the junction of the blocking diode 5 and the field winding 4 and the junction of the motor armature 3 and the second terminal (in FIG. 1 the negative terminal) of the power source. As seen in FIG. 1 the blocking diode 5 and the commutating diode 6 are arranged with their cathodes back to back so that the blocking diode shunts the resistor 2 and the commutating diode shunts the motor armature 3 with the latter diode 6 arranged in such a manner that the counter electro-motive force (EMF)

of the motor armature maintains the commutating diode normally closed.

Figure 2:
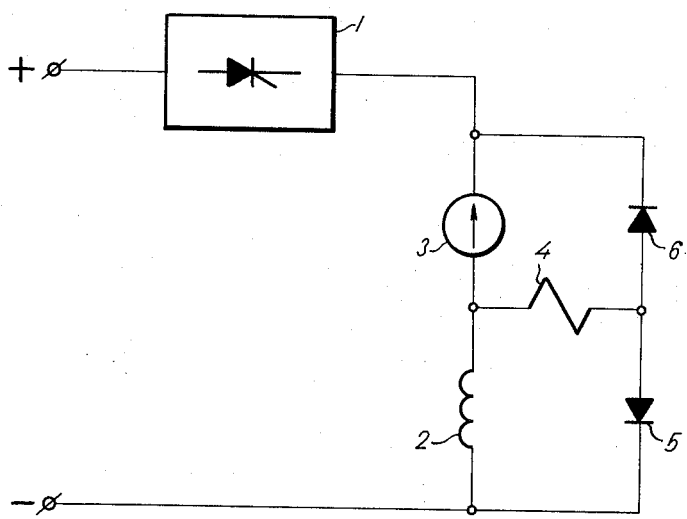
FIG. 2 is a similar diagram showing an embodiment of the invention wherein one pole of the motor armature is connected to the thyristor chopper circuit.

The arrangement shown in FIG. 2 is essentially the same as that seen in FIG. 1 except that one pole of the armature motor is directly connected to the thyristor circuit 1, and the diodes 5 and 6 are arranged with their anodes back to back. Also the thyristor circuit 1 can be connected to the negative terminal of the power source, contrary to that shown in FIG. 1 so that the entire arrangement can be set in an equivalent but reverse manner.

It will thus be seen that the serially connected motor armature and field winding are serially connected to the thyristor circuit and includes a blocking diode one pole of which is connected to the field winding so that the blocking diode is arranged conductively for running current. A shunt resistor is connected in parallel with both the blocking diode and the field winding of the motor.

In operation, current tends to flow through armature 3 and resistor 2 from the terminal of the power source. The chopper circuit 1 is caused to open and close at a rapid rate causing an increased flow of current through the armature 3 and resistor 2. The successive closing of the chopper circuit causes the current to increase in the armature, at a rate limited by the inductance of the arrangement. During the initial closing of the thyristor chopper circuit, no current can actually flow through the arrangement on account of the considerable inductance of the shunting resistor 2. As, however, the thyristor chopper circuit 1 continues to open and close the inductance energy stored in the motor armature 3 opens the commutating diode 6 and completes the motor armature circuit via the commutating diode 6 and the field winding 4. This gives immediate rise to the flow of an exciting current which, after the current in the motor armature circuit dies off, continues to flow through the shunting resistor 2 and the blocking diode 5. Repeated closings and openings of the chopper circuit raise the flow of exciting current in the field winding 4 to the peak current value of the motor armature, thus insuring increased excitation at the beginning of motor operation with maximum current. Gradual transition to longer switching times of the chopper 1 results in lowering the exciting current and a weakening of the motor fields. Permanent closing of the thyristor chopper leads to a weakening of the motor fields to a value determined by the value of the shunting resistor 2 and consequently an increase in running speed. The resistor 2 limits the permissible weakening of the field only so much as will insure satisfactory commutation of the traction motor. After the motor comes to running speed the complete unit becomes connected in series with the chopper circuit directly across the power line and full voltage is delivered to the motor, simultaneously with the controlled field weakening. Under these conditions no voltage or current loss occurs in the arrangement and only a slight voltage drop occurs across the closed thyristor chopper circuit.

It will be observed that initial excitation is accomplished with a large exciting current, obtained by the repeated opening and closing of the thyristor circuit; running speed is obtained at maximum voltage since the circuit components provide series arrangement with little loss of voltage, and; controlled field weakening is obtained by the drop in current the level of which is auto-regulated by the circuit. The present arrangement thus provides an improved circuit for starting and controlling series connected motors and for the infinite weakening of the motor fields on running speed which can be found very suitable for electric traction vehicles, since it produces high speeds quickly without loss of traction torque. Such vehicles include locomotives, streetcars, trolleybuses, electric motor cars. Other uses in mining motors, hoists etc., may also be made. Various changes and modifications have been suggested; others will be obvious to those skilled in this art. The present invention should be taken as illustrative only.

What is claimed is:

1. An arrangement for starting and controlling the speed of a motor having its armature and field windings serially connected to a source of current comprising means for causing intermittent conduction of current and means for unidirectionally blocking the flow of current both of said means being serially arranged with the source of current and the motor, said blocking means having one pole connected to said field winding and arranged conductively for running current; and a resistor connected in parallel between said field winding and said blocking means to shunt said blocking means.

2. The arrangement according to claim 1 including means for varying the interval of conduction.

3. The arrangement according to claim 2 wherein the means for causing intermittent conduction comprises a semi conductor rectifier circuit.

4. The arrangement according to claim 3 wherein the semi conductor rectifier circuit comprises a thyristor chopper circuit.

5. The arrangement according to claim 1 wherein said unidirectional blocking means comprises a diode arranged between said field winding and said means for causing intermittent conduction.

6. The arrangement according to claim 1 wherein said unidirectional blocking means comprises a diode arranged between said field winding and one terminal of said souce of current.

7. The arrangement according to claim 5 wherein one pole of said armature is connected to one terminal of said source.

8. The arrangement according to claim 6 wherein one pole of said armature is connected to said means for intermittent conduction.

9. The arrangement according to claim 1 including a second diode arranged in parallel with said field winding and armature to shunt said armature.

* * * * *